United States Patent
Shen et al.

(10) Patent No.: US 12,373,679 B2
(45) Date of Patent: Jul. 29, 2025

(54) SINGLE-LAYERED LINEAR NEURAL NETWORK BASED ON CELL SYNAPSE STRUCTURE

(71) Applicant: SHANGHAI IC R&D CENTER CO., LTD., Shanghai (CN)

(72) Inventors: Ling Shen, Shanghai (CN); Yu Jiang, Shanghai (CN); Huijie Yan, Shanghai (CN); Zhifang Li, Shanghai (CN); Jianxin Wen, Shanghai (CN)

(73) Assignees: SHANGHAI IC R&D CENTER CO., LTD., Shanghai (CN); SHANGHAI INTEGRATED CIRCUIT EQUIPMENT & MATERIALS INDUSTRY INNOVATION CENTER CO., LTD, Shanghai (CN)

( * ) Notice: Subject to any disclaimer, the term of this patent is extended or adjusted under 35 U.S.C. 154(b) by 961 days.

(21) Appl. No.: 17/602,804

(22) PCT Filed: Aug. 7, 2019

(86) PCT No.: PCT/CN2019/099581
§ 371 (c)(1),
(2) Date: Oct. 11, 2021

(87) PCT Pub. No.: WO2020/206890
PCT Pub. Date: Oct. 15, 2020

(65) Prior Publication Data
US 2022/0156570 A1 May 19, 2022

(30) Foreign Application Priority Data
Apr. 11, 2019 (CN) .................. 2019 1 0290338.8

(51) Int. Cl.
*G06N 3/063* (2023.01)

(52) U.S. Cl.
CPC .................... *G06N 3/063* (2013.01)

(58) Field of Classification Search
CPC ........ G06N 3/063; G06N 3/065; G06N 3/049; G06N 3/088
See application file for complete search history.

(56) References Cited

U.S. PATENT DOCUMENTS

| | | | |
|---|---|---|---|
| 2016/0284400 A1* | 9/2016 | Yakopcic | G11C 11/54 |
| 2018/0053550 A1* | 2/2018 | Rakshit | G11C 11/54 |
| 2020/0035305 A1* | 1/2020 | Choi | G11C 11/54 |

FOREIGN PATENT DOCUMENTS

CN 106815636 A1 6/2017

* cited by examiner

*Primary Examiner* — Kc Chen
(74) *Attorney, Agent, or Firm* — Bayramoglu Law Offices LLC

(57) ABSTRACT

A single-layered linear neural network based on a cell synapse structure comprising a pre-synapse and a post-synapse, the pre-synapse comprises a plurality of precursor resistors, number of the precursor resistors is m, one end of the precursor resistors in the pre-synapse is jointly connected with an intermediate point, and another end of the precursor resistors is respectively connected with each of a plurality of precursor signal input ends, number of the precursor signal input ends is m; the precursor signal input ends are used for receiving input voltages; the post-synapse comprises a plurality of posterior resistors, number of the precursor resistors is n, one end of the posterior resistors in the post-synapse is jointly connected with the intermediate point, and another end of the posterior resistors is respectively connected with each of a plurality of posterior signal output ends, number of the posterior signal output ends is n; the posterior signal output ends are used for outputting currents. The invention provides a single-layered linear neural network based on cell synapse structure, which can reduce the number of resistors; in addition, a weight between an external precursor neuron and an external posterior neuron can be changed only by adjusting two variable resistors or one of the two variable resistors.

9 Claims, 3 Drawing Sheets

==Prior Art==

SINGLE-LAYERED LINEAR NEURAL NETWORK BASED ON CELL SYNAPSE STRUCTURE

CROSS-REFERENCE TO RELATED APPLICATION

This application claims priority of International Patent Application Ser. No. PCT/CN2019/099581, filed Aug. 7, 2019, which is related to and claims priority of Chinese Patent Application Ser. No. CN 201910290338.8, filed Apr. 11, 2019. The entirety of each of the above-mentioned patent applications is hereby incorporated herein by reference and made a part of this specification.

TECHNICAL FIELD

The disclosure relates to the technical field of artificial intelligent neural network, in particular to a single-layered linear neural network based on a cell synapse structure.

BACKGROUND

In a field of artificial intelligence, how to build a reasonable neural network for effective learning which can be implemented by combining with a hardware simultaneously is a very promising research field. Simulation of human brain thinking is also a research direction in recent years. In a field of neuroscience, Hebbian theory is a hypothesis that accounts for changes in neurons in a brain during learning. According to the Hebbian theory, a neuron "A" must make a certain contribution to excitation of a neuron "B", thus the neuron "A" must be excited prior to the neuron "B", rather than be excited simultaneously. In a part of the research of the Hebbian theory, which has been known as STDP (spike time dependent plasticity) lately, indicates that synaptic plasticity requires a certain time for delaying.

The learning style above is an important biological explanation for unsupervised learning. In a hardware, a basic idea, as shown in FIG. 1, a variable resistance matrix array can be constructed, which is formed of M rows and N columns of variable resistors, wherein, each of the M rows of the variable resistors is connected with a precursor voltage, and each of the N columns of the variable resistors is connected with a posterior current receiver. The variable resistance matrix array is adopted to a simulate connection between a pre-synapse and a post-synapse of a single-layered linear neural network, to realize a simplified version of STDP mechanism. Weight between pre-synapse and the post-synapse is changed by changing a certain resistance value.

The configuration in FIG. 1 has a plurality of drawbacks. First, number of resistors required is product of the pre-synapse and the post-synapse, as neuron scale changes, the number of the resistors increases exponentially. Secondly, in the actual single-layered linear neural network, enhancement of a neuron synapse weakens other neurons synapses associated with the neuron synapse, but in the variable resistance matrix array, no mutual influence exists between the resistors, thus only a simple effect can be achieved relative to actual STDP effect.

SUMMARY

The invention aims to provide a single-layered linear neural network based on a cell synapse structure. Compared with the prior art, as number of resistors in the whole single-layered linear neural network is related to number of ports, thus the number of the resistors can be reduced; In addition, by adjusting only two variable resistors or one of the two variable resistors, weights between external precursor neurons and external posterior neurons can be changed.

In order to achieve above objectives, the present invention adopts following technical scheme: a single-layered linear neural network based on a cell synapse structure, which comprises a pre-synapse and a post-synapse, the pre-synapse comprises a plurality of precursor resistors, number of the precursor resistors is m, one end of the precursor resistors in the pre-synapse is jointly connected with an intermediate point, and another end of the precursor resistors is respectively connected with each of a plurality of precursor signal input ends, number of the precursor signal input ends is m; the precursor signal input ends are used for receiving input voltages; the post-synapse comprises a plurality of posterior resistors, number of the posterior resistors is n, one end of the posterior resistors in the post-synapse is jointly connected with the intermediate point, and another end of the posterior resistors is respectively connected with each of a plurality of posterior signal output ends, number of the posterior signal output ends is n; the posterior signal output ends are used for outputting currents; wherein, both of m and n are integers greater than one.

Further, the precursor resistor is a variable resistor and the posterior resistor is a variable resistor.

Further, the precursor resistor is a resistive random access memory and the posterior resistors is a resistive random access memory.

Further, when the weight between one of the pre-synapse and one of the post-synapse is increased, the weights between the pre-synapse and the other synapse are reduced, and the weights between the post-synapse and the other synapse are reduced.

Further, the resistance relationship between the precursor resistors and the posterior resistors is adjusted to expand the weight adjustment threshold of the neural network.

Further, resistance values of the precursor resistors are all greater than resistance values of the posterior resistors.

Further, resistance values of the posterior resistors are all greater than resistance values of the precursor resistors.

Further, a method of varying a resistance value from a k-th precursor signal input end to a i-th posterior signal output end comprises: varying the resistance value of the k-th precursor resistor and/or the resistance value of the i-th posterior resistor, other resistance values of the precursor resistors and the posterior resistors remain unchanged; wherein, k is an integer greater than 0 and less than or equal to m, i is an integer greater than 0 and less than or equal to n.

Further, further comprising a plurality of precursor neurons and a plurality of posterior neurons, number of the precursor neurons is m and number of the posterior neurons is n, each of the precursor neurons is respectively connected with each of the precursor signal input ends, and each of the posterior neurons is respectively connected with each of the n posterior signal input ends.

Further, further comprising a plurality of precursor neuron circuits and a plurality of posterior neuron circuits, number of the precursor neuron circuits is m and number of the posterior neuron circuits is n, the precursor neuron circuits are corresponding to the precursor neurons, and the posterior neuron circuits are corresponding to the posterior neurons respectively; output ends of the posterior neuron circuits are jointly connected with the intermediate point and the precursor neuron circuits.

Beneficial effects of the present invention are: in the present invention, the resistance characteristic of the single-layer linear neural network is very close to that of actual STDP mechanism, that is, when weight between two neurons is increased, weights between the two neurons and other neurons can be reduced. Each of associated resistance values is needed to be adjusted to adjust all weights of a traditional matrix network, but in the present invention, two resistors or one of the two resistors are needed to be adjusted to achieve the same effect. In addition, number of resistors of the whole single-layered linear neural network is only once related to number of ports, and compared with twice related in the prior art, fewer resistors are used under the same condition, that is, the number of the resistors is reduced from m*n in FIG. 1 to m+n.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

For purposes, aspects, and advantages of the present invention, a further detailed description of specific embodiments of the present invention is given below in conjunction with accompanying drawings.

Figure 2:
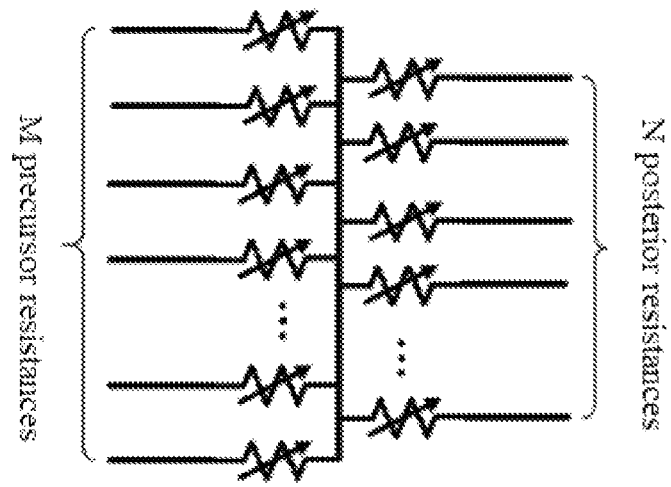
FIG. 2 is a schematic frame diagram of a single-layered linear neural network based on a cellular synaptic structure of the present invention.

As shown in FIG. 2, the present invention provides a single-layered linear neural network based on a cell synapse structure, which comprises a pre-synapse and a post-synapse, the pre-synapse comprises a plurality of precursor resistors, number of the precursor resistors is m, one end of the precursor resistors in the pre-synapse is jointly connected with an intermediate point, and another end of the precursor resistors is respectively connected with each of a plurality of precursor signal input ends, number of the precursor signal input ends is m; the precursor signal input ends are used for receiving input voltages.

The post-synapse comprises a plurality of posterior resistors, number of the posterior resistors is n, one end of the posterior resistors in the post-synapse is jointly connected with the intermediate point, and another end of the posterior resistors is respectively connected with each of a plurality of posterior signal output ends, number of the posterior signal output ends is n; the posterior signal output ends are used for outputting currents; wherein, both of m and. n are integers greater than one.

In the present invention, the precursor resistor is a variable resistor and the posterior resistor is a variable resistor, thus variable resistors exist in the single-layered linear neural network, total number of the resistors is m+n, and the specific variable resistors can be resistive random access memories, for example.

Figure 3:
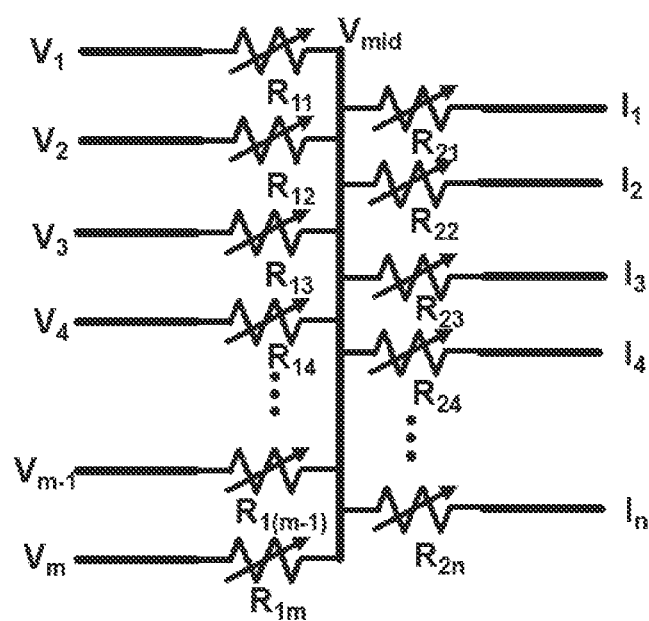
FIG. 3 is a schematic representation of resistances of a single-layered linear neural network based on a cellular synaptic structure of the present invention.

In the cell synapse structure of FIG. 2, the precursor signal input ends provide voltages, the posterior signal output ends receive current values derived from a resistive network, each of current values of the posterior signal output ends is related to each of voltage values of the precursor signal input ends and each of resistors of the resistive network. Specifically, as shown in FIG. 3, assuming that the voltage values of the precursor signal input ends are $V_1, V_2 \ldots, V_m$, the current values of the posterior signal output ends are $I_1, I_2 \ldots, I_n$, resistance values of the precursor resistors are $R_{11}, R_{12} \ldots, R_{1m}$, and resistance values of the posterior resistors are $R_{21}, R_{22}, \ldots, R_{2n}$, voltage value of the intermediate point is $$V_{mid} = \frac{\sum_{k=1}^{m} \frac{V_k}{R_{1k}}}{\sum_{k=1}^{m} \frac{1}{R_{1k}} + \sum_{k=1}^{n} \frac{1}{R_{2k}}}$$

Thus, current value of a i-th posterior signal output end can be derived, as $$I_i = \frac{\sum_{k=1}^{m} \frac{V_k}{R_{1k}}}{\left(\sum_{k=1}^{m} \frac{1}{R_{1k}} + \sum_{k=1}^{n} \frac{1}{R_{2k}}\right) * R_{2i}} = \sum_{k=1}^{m} \frac{V_k}{R_{e\_ki}}$$

Wherein, $$R_{e\_ki} = \frac{\left(\sum_{k=1}^{m} \frac{1}{R_{1k}} + \sum_{k=1}^{n} \frac{1}{R_{2k}}\right) * R_{2i}}{\frac{1}{R_{1k}}} = \left(\sum_{k=1}^{m} \frac{1}{R_{1k}} + \sum_{k=1}^{n} \frac{1}{R_{2k}}\right) * R_{2i} * R_{1k}$$

Wherein, $V_k$ represents a voltage value inputted by a k-th precursor signal input end, $R_{1k}$ represents a resistance value of a k-th precursor resistor, $R_{2k}$ represents a resistance value of a k-th posterior resistor, $R_{2i}$ represents a resistance value of a i-th posterior resistor, $R_{e\_ki}$ represents an equivalent resistance value from a k-th precursor signal input end to a i-th posterior signal output end, and it can be found that the resistance value from the k-th precursor signal input end to the i-th posterior signal output end is positively related to the resistance value of the k-th precursor resistor and the resistance value of the i-th posterior resistor, and a change rate is related to other resistance values of the precursor resistors and the posterior resistors, the smaller the other resistance values of the precursor resistors and the posterior resistors are, the stronger the positive correlation is, and the resistance values of the precursor resistors and the posterior resistors are negatively related to the resistance value of the k-th precursor resistor and the resistance value of the i-th posterior resistor. That is, on basis of the cellular synaptic structure in the present invention, a method for changing the resistance value from the k-th precursor signal input end to the i-th posterior signal output end comprises following steps: varying the resistance value of the k-th precursor resistor and/or the resistance value of the i-th posterior resistor, and the other resistance values of the precursor resistors and the posterior resistors remain unchanged; wherein, k is an integer greater than 0 and less than or equal to m, i is an integer greater than 0 and less than or equal to n.

Figure 1:
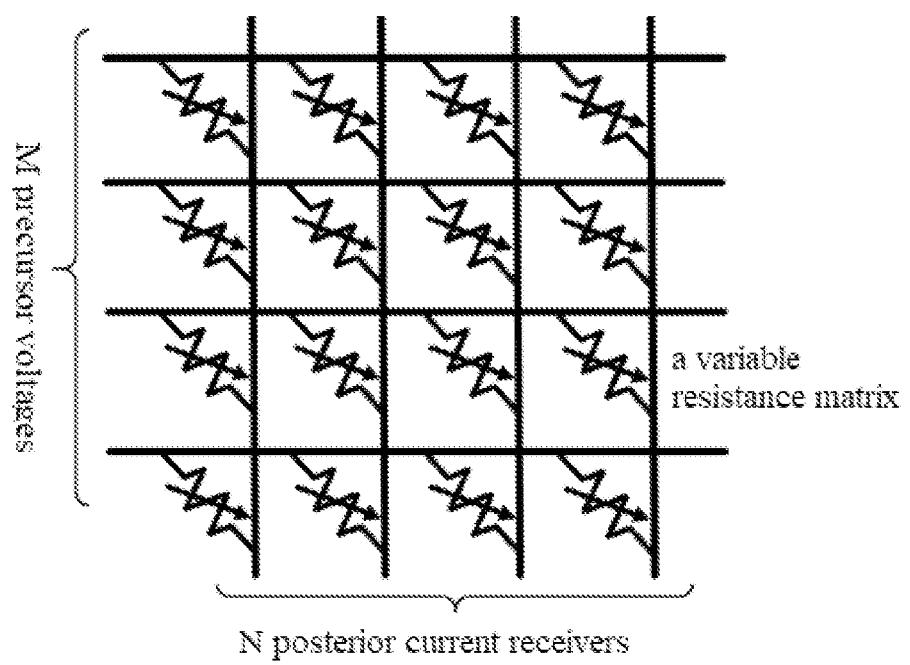
FIG. 1 is a schematic diagram of a neural network variable resistance matrix array of a prior art.

Because the resistance characteristic of the single-layered linear neural network is very close to the actual STDP mechanism, that is, when the weight between one of the pre-synapse and one of the post-synapse is increased, the weights between the pre-synapse and the other synapse are reduced, and the weights between the post-synapse and the other synapse are reduced. During changing of the resistance value of the k-th precursor resistor and/or the resistance value of the i-th posterior resistor, as described above, assuming that the resistance values of the k-th precursor resistor and the i-th posterior resistor are simultaneously changed, and the other resistance values of the m pre-synapses and the n post-synapses remain unchanged, the weight between the k-th precursor synapse and the i-th post-synapse is increased, and the weights between the k-th precursor synapse and other remaining n−1 post-synapses are reduced; similarly, the weights between the other remaining m−1 pre-synapses and the i-th post-synapse is reduced. That is, by adjusting two variable resistors or one of the two variable resistors in the single-layered linear neural network, the weights of the whole single-layered linear neural network can be correspondingly changed. But in the traditional structure shown in the FIG. 1, weights can be adjusted only by adjusting a related resistance value.

Based on the above, the resistance values of the precursor resistors and the posterior resistors can be reasonably designed, thus the resistance values of the precursor resistors or the posterior resistors are larger, and the weight adjustment threshold of the neural network is larger. Specifically, the resistance values of the precursor resistors are larger than the resistance values of the posterior resistors, or the resistance values of the posterior resistors are larger than the resistance values of the precursor resistors.

Figure 4:
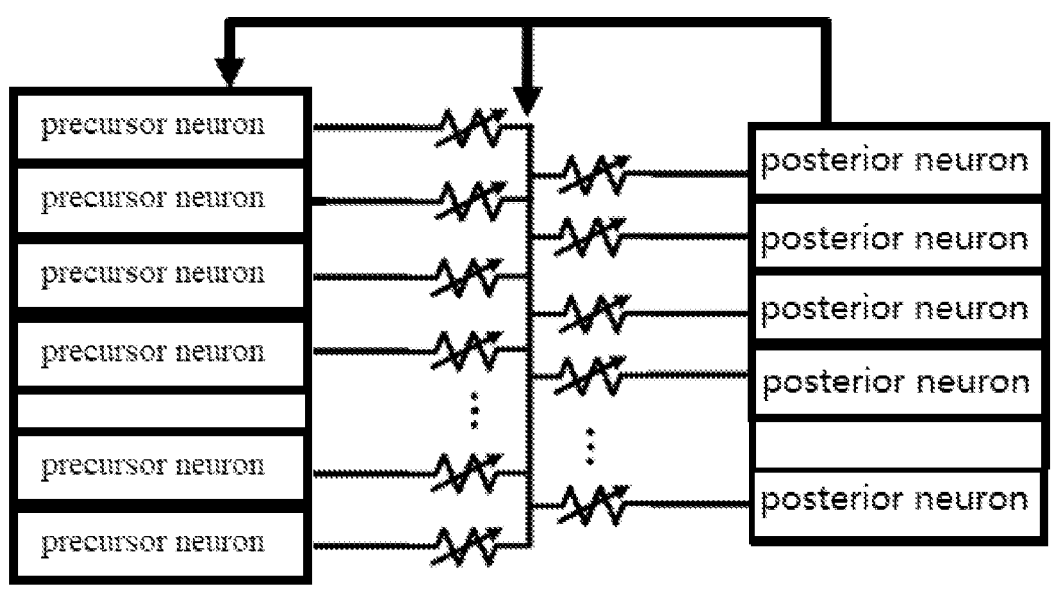
FIG. 4 is a schematic diagram of an approximate circuit architecture of a single-layered linear neural network based on a cellular synaptic structure implemented with RRAM according to the present invention.

As shown in FIG. 4, based on the above, a RRAM with multi-value storage characteristic is used as the precursor resistors and the posterior resistors, a plurality of precursor neurons, a plurality of posterior neurons, a plurality of precursor neuron circuits and a plurality of posterior neuron circuits are respectively designed correspondingly to the precursor resistors and the posterior resistors, number of the precursor neurons is m and number of the posterior neurons is n, number of the precursor neuron circuits is m and number of the posterior neuron circuits is n, wherein, the precursor neurons are respectively connected with the pre-cursor signal input ends, and the posterior neurons are respectively connected with the posterior signal input ends; output ends of the posterior neuron circuits are jointly connected with the intermediate point and the precursor neuron circuits, so as to form a basic cranial nerve-like network to realize STDP mechanism.

As shown in FIG. 4, the precursor neuron circuits are responsible for converting stimulation signals into pulse voltage signals, which are used as input voltages of the precursor signal input ends, the posterior neuron circuits comprise a processing module, which is used for receiving and processing currents outputted by the m posterior signal output ends, and judging whether the currents are eligible for a triggering condition of changing the RRAM, if a current is eligible for the triggering condition, then a stimulation signal is feedback to a corresponding precursor neuron by a corresponding posterior neuron circuit, and cooperated with a corresponding precursor signal of a corresponding precursor neuron to operate a programming of a corresponding precursor resistor, so as to realize updating the resistance value of the corresponding precursor resistor; If the current is not eligible for the triggering condition, then the stimulation signal is not feedback. After the current is received by a posterior neuron circuit, according to the triggering condition, the single-layered linear neural network judges which precursor resistor or posterior resistor needs to be changed, then a signal corresponding to a judging result is feed back to the m precursor circuits, and cooperated with an externally applied voltage to operate a programming of the precursor resistors or the posterior resistors needs to be changed.

The above descriptions are only the preferred embodiments of the present invention, and the described embodiments are not used to limit the scope of patent protection of the present invention. Therefore, any equivalent structural changes made using the contents of the description and drawings of the present invention should be included in the same reasoning. Within the protection scope of the appended claims of the present invention.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A single-layered linear neural network circuit structure based on a cell synapse structure, comprising;
   a pre-synapse circuit, and
   a post-synapse circuit;
   wherein the pre-synapse circuit comprises a plurality of precursor resistors, number of the precursor resistors is m, one end of each of the precursor resistors in the pre-synapse circuit is jointly connected with an intermediate point, and another end of each of the precursor resistors is respectively connected with each of a plurality of precursor signal input ends, number of the precursor signal input ends is m; the precursor signal input ends are used for receiving input voltages;
   wherein the post-synapse circuit comprises a plurality of posterior resistors, number of posterior resistors is n, one end of each of the posterior resistors in the post-synapse circuit is jointly connected with the intermediate point, and another end of each of the posterior resistors is respectively connected with each of a plurality of posterior signal output ends, number of the posterior signal output ends is n; the posterior signal output ends are used for outputting currents; wherein, both of m and n are integers greater than one;
   wherein the cell synapse structure of the pre-synapse and the post-synapse circuit of the single-layer linear neural network circuit represents a spike time dependent plasticity mechanism; and
   wherein an increase in a weight, represented by a resistance value between one of the plurality of precursor resistors of the pre-synapse circuit and one of the plurality of posterior resistors of the post-synapse circuit, causes reduction in weights, represented by resistance values between the one precursor resistor of the pre-synapse circuit and the other remaining posterior resistors of the post-synapse circuit, as well as reduction in other weights, represented by resistance values between the one posterior resistor of the post-synapse circuit and the other remaining precursor resistors of the pre-synapse circuit.

2. The single-layered linear neural network circuit structure of claim 1, wherein each of the precursor resistors is a variable resistor and each of the posterior resistors is a variable resistor.

3. The single-layered linear neural network circuit structure of claim 2, wherein the precursor resistors are resistive random access memories and the posterior resistors are resistive random access memories.

4. The single-layered linear neural network circuit structure of claim 1, a resistance relationship between the precursor resistors and the posterior resistors is adjusted to expand a weight adjustment threshold of the single-layered linear neural network.

5. The single-layered linear neural network circuit structure of claim 4, wherein resistance values of the precursor resistors are all greater than resistance values of the posterior resistors.

6. The single-layered linear neural network circuit structure of claim 4, wherein resistance values of the posterior resistors are all greater than resistance values of the precursor resistors.

7. The single-layered linear neural network circuit structure of claim 1, wherein a method of varying a resistance value from a k-th precursor signal input end to an i-th posterior signal output end comprises: varying the resistance value of the k-th precursor resistor and/or the resistance value of the i-th posterior resistor, resistance values of the other precursor resistors and the other posterior resistors remain unchanged; wherein, k is an integer greater than 0 and less than or equal to m, i is an integer greater than 0 and less than or equal to n.

8. The single-layered linear neural network circuit structure of claim 1, wherein further comprising a plurality of precursor neurons and a plurality of posterior neurons, number of the precursor neurons is m and number of the posterior neurons is n, each of the precursor neurons is respectively connected with each of the precursor signal input ends, and each of the posterior neurons is respectively connected with each of the posterior signal input ends.

9. The single-layered linear neural network circuit structure of claim 8, wherein further comprising a plurality of precursor neuron circuits and a plurality of posterior neuron circuits, number of the precursor neuron circuits is m and number of the posterior neuron circuits is n, the precursor neuron circuits are corresponding to the precursor neurons, and the posterior neuron circuits are corresponding to the posterior neurons respectively; output ends of the posterior neuron circuits are jointly connected with the intermediate point and the precursor neuron circuits.

* * * * *